(12) United States Patent
Krappe et al.

(10) Patent No.: US 9,747,562 B1
(45) Date of Patent: Aug. 29, 2017

(54) LINKING STRUCTURED DATABASE MANAGEMENT SYSTEMS WITH DOCUMENT CREATION AND WORD PROCESSING TOOLS

(75) Inventors: Kirk Krappe, Portola Valley, CA (US); Neehar Giri, Saratoga, CA (US)

(73) Assignee: APTTEX CORPORATION, San Mateo, CA (US)

( * ) Notice: Subject to any disclaimer, the term of this patent is extended or adjusted under 35 U.S.C. 154(b) by 0 days.

(21) Appl. No.: 13/423,280

(22) Filed: Mar. 19, 2012

(51) Int. Cl.
  *G06F 7/00* (2006.01)
  *G06Q 10/06* (2012.01)
  *G06Q 50/18* (2012.01)

(52) U.S. Cl.
  CPC ............ *G06Q 10/06* (2013.01); *G06Q 50/18* (2013.01)

(58) Field of Classification Search
  CPC .......... G06Q 10/06; G06Q 50/18; G06F 8/71
  USPC .................. 707/695, 628, 632; 715/208, 228
  See application file for complete search history.

(56) References Cited

U.S. PATENT DOCUMENTS

| | | | | |
|---|---|---|---|---|
| 5,805,889 | A * | 9/1998 | Van De Vanter | 717/107 |
| 7,080,076 | B1 * | 7/2006 | Williamson | G06F 17/24 |
| 7,194,433 | B1 * | 3/2007 | Hyakutake et al. | 705/34 |
| 7,624,145 | B2 * | 11/2009 | Junuzovic et al. | 709/205 |
| 2004/0019578 | A1 * | 1/2004 | Kalmes et al. | 707/1 |
| 2006/0287966 | A1 * | 12/2006 | Srinivasaraghavan | G06Q 50/188 705/80 |
| 2007/0260612 | A1 * | 11/2007 | Papakonstantinou et al. | 707/10 |
| 2008/0059365 | A1 * | 3/2008 | Lee | G06Q 10/10 705/38 |
| 2009/0210459 | A1 * | 8/2009 | Nair et al. | 707/203 |
| 2010/0318894 | A1 * | 12/2010 | Billharz et al. | 715/234 |
| 2012/0331404 | A1 * | 12/2012 | Buford et al. | 715/757 |
| 2013/0013987 | A1 * | 1/2013 | Kim | 715/201 |

OTHER PUBLICATIONS

Hasan S., Multi-language Online Word Processor for Learners and the Visually Impaired, A. Marcus (Ed.): Design, User Experience, and Usability, Pt I, HCII 2011, LNCS 6769, pp. 256-260, 2011.*
Meij et al., Mapping queries to the Linking Open Data cloud: A case study using DBpedia, Web Semantics: Science, Services and Agents on the World Wide Web 9 (2011) 418-433.*

* cited by examiner

*Primary Examiner* — Cheyne D Ly
(74) *Attorney, Agent, or Firm* — HM Law Group LLP; Vani Moodley, Esq.

(57) ABSTRACT

Linking structured database management systems with document creation tools. Allowing the user of a document creation application to access cloud-based or behind firewall contract creation and management utilities without ever leaving the document interface itself. Inserting object templates stored in a cloud-based contract creation and management application from a native document creation application and flagging the document itself to indicate the presence of intelligent fields of structured data.

16 Claims, 13 Drawing Sheets

LINKING STRUCTURED DATABASE MANAGEMENT SYSTEMS WITH DOCUMENT CREATION AND WORD PROCESSING TOOLS

RELATED APPLICATIONS

This application is related to U.S. patent application Ser. No. 13/423,283, filed Mar. 19, 2012, entitled "SOCIAL MEDIA INTEGRATION AND COLLABORATION TOOLS IN A SYSTEM FOR LINKING STRUCTURED DATABASE MANAGEMENT SYSTEMS WITH DOCUMENT CREATION TOOLS" and is related to U.S. patent application Ser. No. 13/423,282, filed Mar. 19, 2012, entitled "RECONCILING SMART FIELDS," both of which are Divisionals of this application, and both of which are incorporated herein in their entirety.

BACKGROUND OF THE INVENTION

Technical Field

The invention relates to the field of business management. More specifically, the invention relates to using structured data in a document creation application.

Description of the Related Art

The increased availability of computer systems and the ability to connect the computer systems using various networks such as intranets and the Internet, for example, has made vast repositories of information and cloud-managed software applications available to a large number of people. In many instances, having such a large amount of information at one's fingertips greatly enhances productivity.

These advances in information accessibility and processing have created other challenges, e.g., how to manage such a large collection of information. Many new tools have been developed to deal with the ever-expanding volume of information that is now available for consumption in an electronic form.

Some approaches to managing vast amounts of information utilize a structured database management system. Indeed, it is highly useful to access a structured database management system and run applications thereon, i.e. applications for managing customer or partner engagement, managing the contract process/lifecycle, and for automatically generating documents.

However, despite the ability to manage business relationships through an application with access to a structured database management system, most business relationships are memorialized using word processing software and managed by manual human analysis.

SUMMARY OF THE INVENTION

In view of the foregoing, the invention provides systems and methods of linking structured database management systems with document creation and word processing tools. Some embodiments of the invention involve a computer architecture including an add-in for linking document creation application with a behind firewall database management system or a cloud-based structured database management system.

Some embodiments of the invention involve tools for allowing the user of a document creation application to access a behind firewall database management system or cloud-based contract or quote creation and management utilities without ever leaving the document interface itself.

Some embodiments of the invention involve a method of accessing and using add-in for enabling a document creation and word processing application with the functionality of a contract creation and management application as well as othe capabilities such as social media tools and functional capabilities in the backend application enabled directly in the word document.

Some embodiments of the invention involve inserting object templates, stored in any backend application as well as a cloud-based contract creation and management application, from a native document creation application and flagging the document itself to indicate the presence of intelligent fields or sections of structured data.

BRIEF DESCRIPTION OF THE DRAWINGS

FIG. 6 illustrates an interface for defining contract language as conditional according to some embodiments of the invention;

DETAILED DESCRIPTION OF THE INVENTION

Systems and methods are provided for utilizing the Web Services Description Language of one or more structured database management system to communicate with a business management application. In some embodiments of the invention, the business management application is accessed using an API call from a document creation and word processing application. Although a document creation and word processing application is explicitly described, those with ordinary skill in the art having the benefit of the disclosure will appreciate that the invention can also be implemented in connection with spreadsheet creation applications; applications designed for creating, manipulating, managing, and printing documents in a portable document format (.pdf); presentation creation applications; graphics editing programs; video editing programs; website design applications; etc.

In some embodiments of the invention the business management application comprises a business lifecycle management application for creating a quote for a prospect or customer, engaging and negotiating an agreement, order management and invoicing and any forms required in the business process that need the document to be communicating and interacting with the backend business application. In the presently preferred embodiments of the invention, a contract creation and contract lifecycle management application accesses a cloud-based structured database management system via an add-in for a word processing application. Although a cloud-based structured database management system is explicitly described, those with ordinary skill in the art having the benefit of the disclosure will appreciate that the invention can also be implemented in a behind firewall database management system with the same effectiveness.

Figure 1:
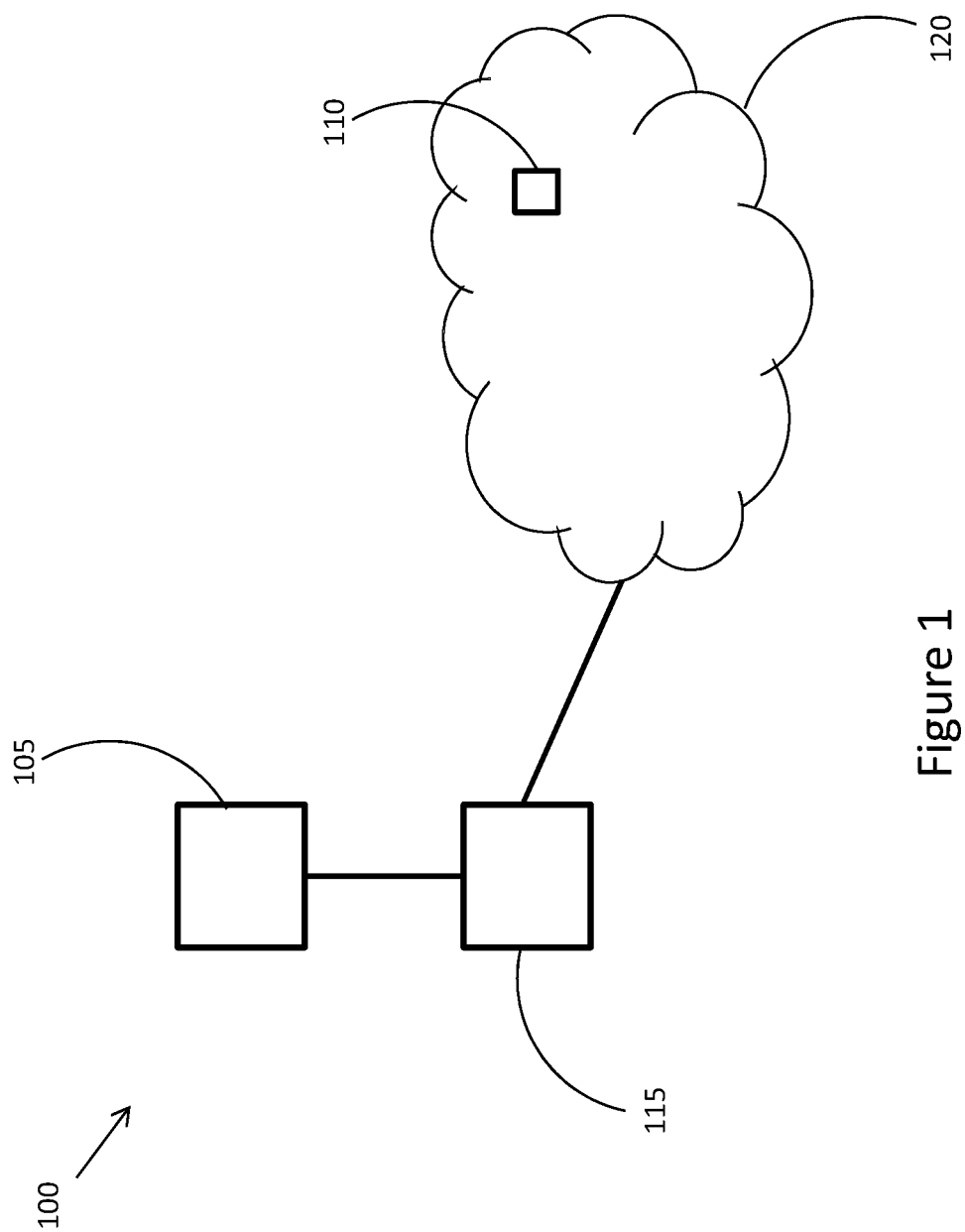
FIG. 1 illustrates an example of architecture for providing a document creation application with access to business management application according to some embodiments of the invention.

FIG. 1 illustrates an example of architecture 100 for providing a document creation application 105 with access to business management application 110 according to some embodiments of the invention. According to FIG. 1, the business management application 110 is hosted on a cloud-based structured database management system 120 or a behind the firewall application. In some embodiments of the invention, the cloud-based structured database management system 120 comprises a platform-as-a-service offering, such as those offered by Salesforce®, located at One Market Plaza, Suite 300, San Francisco, Calif., 94105, United States.

According to FIG. 1, the business management application 110 is accessed by the document creation and processing application 105 through a managed add-in 115 that transfers web service calls to the business management application 110 via the structured database management system 120. Accordingly, a user accesses structured data from the structured database management system 120 as well as the business management application's 110 functionality via the document creation and processing application 105.

In most cases, the business management application 110 and the structured database management system 120 require log-in credentials. In some cases, the log-in credentials are the same for both the business management application 110 and the structured database management system 120. In the presently preferred embodiment of the invention, a user enters his structured database management system 120 log-in credentials via the document creation and processing application 105.

In some embodiments of the invention, once the user logs into the document creation and processing application 105 using his structured database management system 120 credentials, a session identifier is stored within the add-in 115 so that the successive calls can be invoked in the same session context until the user logs out of the system.

In some embodiments of the invention, the add-in is configured to display interactive menus, buttons, text fields, etc. either via windows native to the document creation and processing application 105, browser-based windows common to the structured database management system 120, or a combination thereof.

In some embodiments of the invention, a browser-based form loads a dynamic interactive page from the business management application 110 in the structured database management system 120. In one illustrative example, a browser-based form loads a dynamic interactive Visualforce® page from a contract lifecycle management product in the Salesforce.com cloud. According to this example, the browser-based form helps the customer to extend or improvise the Visualforce® page according to their organizational needs, thereby enabling zero maintenance on the deployment of the add-in 115 on each of the organization users' desktops.

In some other embodiments of the invention, the add-in 115 is configured to display interactive menus, buttons, text fields, etc. via the document creation application 105 itself.

According to some embodiments of the invention, business management application 110 comprises a contract management application designed for contract administrators and legal users to help streamline the process of creating and maintaining contracts and associated contract and clause templates. Since these users are familiar with drafting, revising, and negotiating contracts using common word processing software, it is desirable to offer the benefits and functionality of the contract management application from within the native word processing environment. Using the contract management application, contract administrators can manage complex negotiation cycles, clauses, and contract templates easily.

In some embodiments of the invention, the contract management application provides support for versioning of agreements, and contract administrators can save internal, external, and final versions of non-standard language in a the word processing application whether accessed locally or via a browser-based interface for accessing the business management application 110. When saving final versions, the contract management application also helps the user to reconcile any terms that might have changed during the approval process. Contract and clause templates can also be managed, including the ability to insert, save as, and replace them to and from the business management application 110. Additionally, users can compare versions of a contract. In some embodiments of the invention, the contract management application provides also provides support for creating conditional text within a contract or clause template. This allows contract administrators to create sophisticated conditional clauses that can include or exclude certain text or clauses depending on how a conditional expression containing valid agreement related merge fields is evaluated. These and other features are described in more detail below.

Figure 2A:
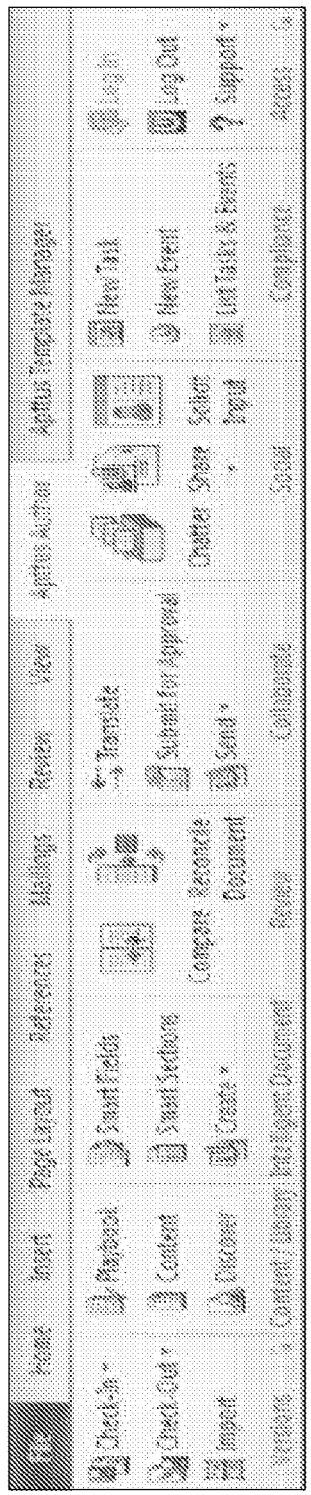
FIG. 2A illustrates an example of an interactive ribbon menu for interacting with the business management application and the structured database management system via a document creation application according to some embodiments of the invention.

FIG. 2A illustrates an example of an interactive ribbon menu 200 for interacting with the business management application 110 and the structured database management system 120 via a document creation application 105 according to some embodiments of the invention. According to FIG. 2A, the interactive ribbon menu 200 includes a variety of tools for adding collaborative functionality and lifecycle management utility to a word processing document. In some embodiments of the invention, the interactive ribbon menu 200 provides at least the following utilities: amending and saving contract agreements to the business management application 110; providing the ability to highlight reconcilable data; providing the ability to reconcile agreement records; providing the ability to view social media feeds from within the word processing application; providing the ability to share content and documents via social media including tools such as Salesforce Chatter, Facebook, Twitter, etc; providing the ability to translate a content from one language to another from within the word processing application; providing the ability to create reminder tasks or schedule appointment events in relation to the currently opened agreement document; providing tools for agreement contract versioning; providing the ability to store unique versions of word processing files that are marked with an explicit version number as attachments to the business management application 110, thereby keeping multiple versions of an agreement with a rich history of all changes made to an agreement by all parties; and allowing contract administrators the ability to compare different versions of agreements in a side by side view.

Figure 2B:
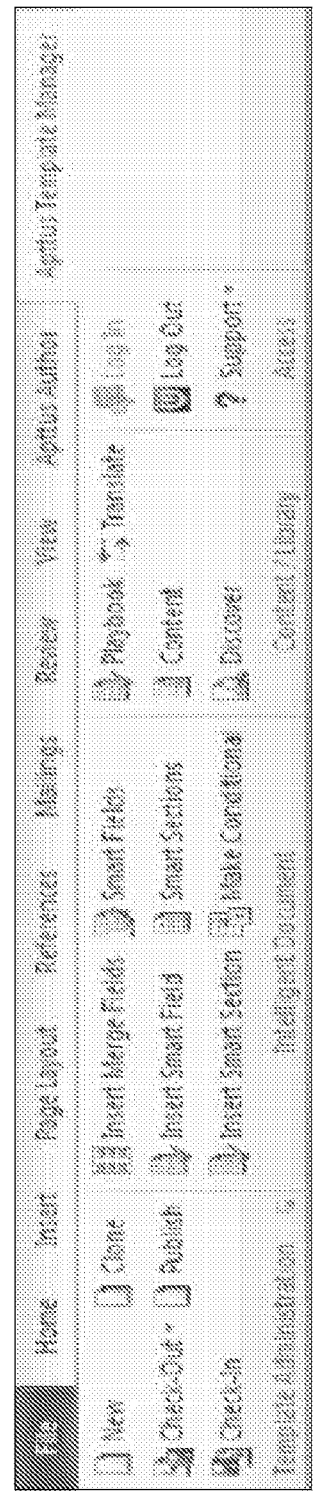
FIG. 2B illustrates an example of an interactive ribbon menu for interacting with the business management application and the structured database management system via a document creation application according to some embodiments of the invention.

FIG. 2B illustrates an example of an interactive ribbon menu 200 for interacting with the business management application 110 and the structured database management system 120 via a document creation application 105 according to some embodiments of the invention. According to FIG. 2B, the interactive ribbon menu 200 includes a variety of tools for managing the agreement contract templates related functions for contract administrators by providing at least the following abilities: creating complex contract templates from existing word processing documents or other contract templates from the business management application 110; inserting clauses from clause libraries either as an inline clause or as clause reference which gets resolved during the generation of the contract agreement; inserting conditional clauses or text; inserting merge fields as smart fields which enables reconciliation process; creating new contract templates, check-out an existing contract template and check-in contract template; and translating a clause from one language to another from within the word processing interface.

As explained above, the presently preferred embodiments of the invention involve a contract creation (aka agreement management) and lifecycle management application accessing a cloud-based or behind firewall structured database management system via an add-in for a word processing application. Accordingly, a plurality of tools is presented to the end users to assist with agreement management.

For example, in some embodiments of the invention, agreement management tools allow contract administrators and legal users the ability to save internal, external, or final versions of a contract to the database management system 120, the business management application 110, or both. In some embodiments of the invention, non-standard language can be replaced in a contract using a tool for providing contract version support using a word processing application's existing versioning capability, as well as the ability to store unique versions that are marked with an explicit version number (i.e. Sample Contract_v2_Internal.doc) and stored as attachments in the database management system 120, the business management application 110, or both. Indeed, using these tools allows multiple versions of an agreement to be kept with a rich history of all changes made to an agreement by all parties. Additionally, version management tools allow contract administrators the ability to compare different versions of agreements in a side by side view.

In some embodiments of the invention, one or more of the following agreement management tools are offered to end users:

Save as Internal Version Tool

In some embodiments of the invention, a Save as Internal Version Tool saves an internal ("private") version of the contract in the database management system 120, the business management application 110, or both. The internal version is appropriately marked as "Internal" and optionally contains redlines and all changes to date.

Save as External Version

In some embodiments of the invention, a Save as External Version Tool saves an external ("public") version of the contract in the database management system 120, the business management application 110, or both. The external version is marked as "External" and optionally has all redlines removed. The external version can be safely sent to an external third party for review without concern that the third party might glean confidential or sensitive information from the previous, red-lined versions.

Save as FINAL Version

In some embodiments of the invention, a Save As Final Version Tool saves a final version of the contract in the database management system 120, the business management application 110, or both. The final version is marked as "External" which has all redlines removed and asks the user to reconcile the contract.

Update Version

In some embodiments of the invention, an Update Version tool updates an existing version of an agreement in the database management system 120, the business management application 110, or both with the current version loaded in the document creation application 105.

Compare Versions

In some embodiments of the invention, a Compare Version tool compares any two versions of an agreement stored in the database management system 120, the business management application 110, or both with each other and shows differences in a side-by-side view within the document creation application 105.

Checking in Data and Templates

In some embodiments of the invention, a Check In tool saves data, templates, option changes, etc. back into the structured database management system, the business management application 110, or both. These tools perform actions that potentially have a permanent impact on the entire enterprise; therefore, in some embodiments of the invention, the use of the check in tools requires a high degree of authorization.

A template can be checked-in to the structured database management system, the business management application 110, or both by clicking the Check-In menu in the Templates tab. Once clicked, the add-in 115 automatically populates the template properties and a user interface is presented to the user, allowing the user to specify options and update the document back to business management application 110 in the cloud.

Template Library

In some embodiments of the invention, a Template Library tool is available for agreement management and for template management. Templates are described in more detail below; however, briefly, the Template Library tool allows a user not have to completely edit a clause, but use it with the clause libraries in the process of negotiating and select from previously defined acceptable clauses from the template library thereby allowing for a greater degree of delegation and experience sharing. Templates also allow greater control of the document creation process. Also, using templates with the enhanced redlining capability allows user to compare modified clauses to the existing clauses in library and show the actual differences only.

Save as Agreement Clause

In some embodiments of the invention, a Save As tool saves selected text to the database management system 120, the business management application 110, or both and creates associated entries in an agreement clause table for the agreement that is being edited.

Workflow

In some embodiments of the invention, one or more of the tools listed herein or disclosed elsewhere perform actions that change the data in the structured database management system 120 itself. By its very nature, business data is sensitive and oftentimes extremely secret. Accordingly, some embodiments of the invention involve security protocols and permission verification check before allowing a user to change the structured data.

Figure 3:
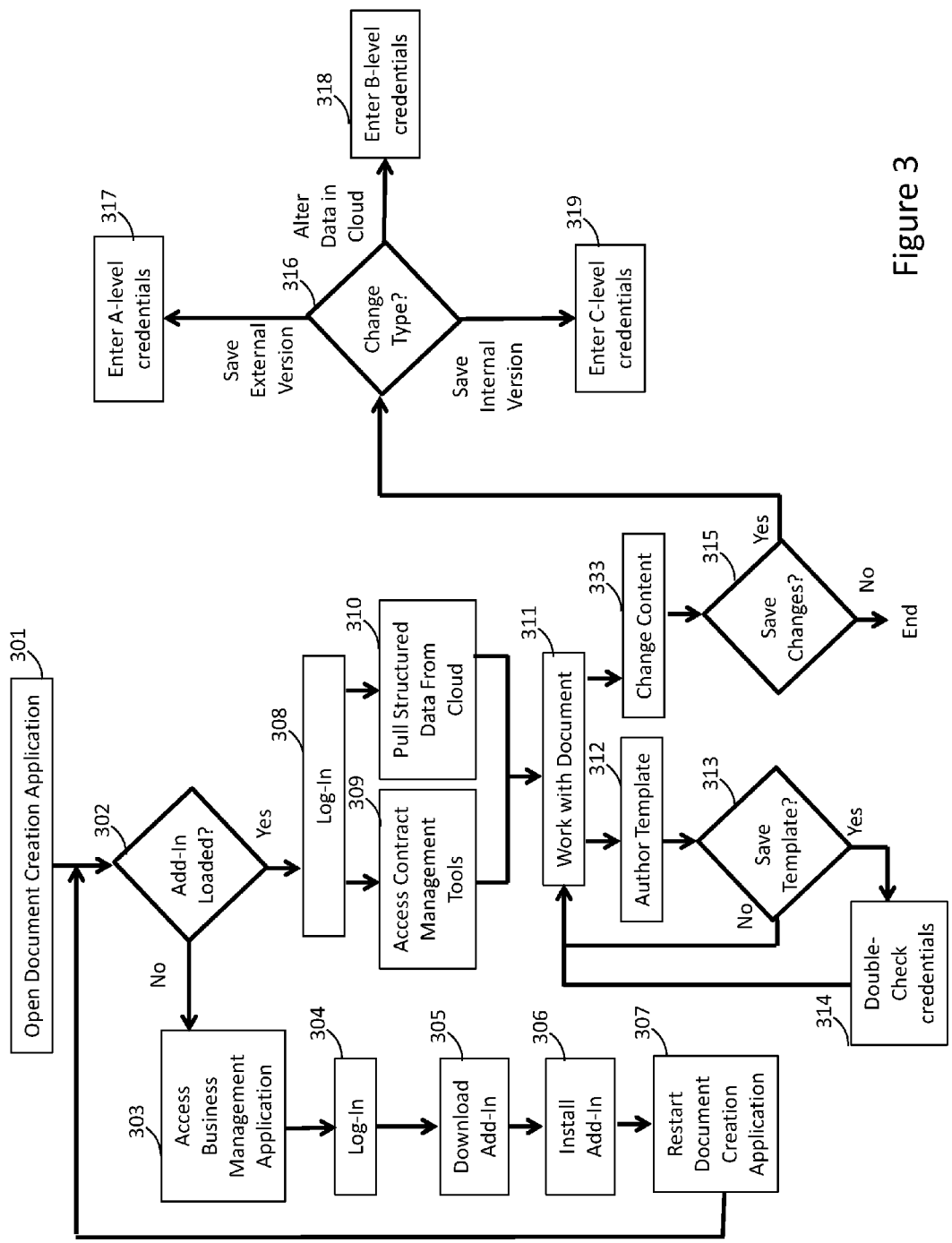
FIG. 3 illustrates a method of contract management by one or more end user via document creation software according to some embodiments of the invention.

FIG. 3 illustrates a method 300 of contract management by one or more end user via document creation software according to some embodiments of the invention. The method 300 begins with a user opening the document creation application 301. Next, a determination 302 is made whether or not the add-in 115 is already loaded. If not, a user can access 303 the business management application 110 directly, log in 304, download the add-in 305, and install the add-in 306. Once the add-in is newly installed, the user restarts 307 the document creation application 105 to begin using the add-in. If the add-in is already loaded into the document creation application 105, the method 300 continues by asking the user to log in 308. In some embodiments of the invention, the document creation application 105 asks a user to log-in when he first attempts to use the add-in ribbon menu.

In some embodiments of the invention, logging in comprises being challenged with a user name and password. In some embodiments of the invention, logging in comprises the user entering a username and password and also using a security token if trying to login outside the company's trusted network. In some embodiments of the invention, the login processes 304, 308 involve entering log in information of the structured database management system 120, the business management application 110, or both. According to these embodiments, once the user clicks on the login button, the add-in invokes a web service call to challenge the user credential in the cloud. Upon validation of the user's credentials, the business management application 110 sends the user back a login success message along with a session id. If login is unsuccessful then it sends in back a fault code for the error.

Once the user is successfully logged in, he may access contract management tools 309 using the add-in 115 via an interface within the document creation application 105 and pull 310 structured data from the structured database management system 120 cloud, and work with the document 311 using the document creation application 105.

As will be explained in more detail below, the contract management tools include tools for using existing templates and authoring new templates. In some embodiments of the invention, a button in the ribbon is configured to create agreement templates. The user has an option to either checkout an existing agreement template or author an agreement template from scratch. If the user authors an original template 312, he can choose to save 313 the authored template in the structured database management system 120, the business management application 110, or both. In some embodiments of the invention, if the user chooses to save the template, the add-in double-checks the user's credentials 314 to ensure that he is authorized to save authored templates.

Next, once a user changes 333 the document and is finished working with the document 311, he may choose to save 315 the changes he made to it. As explained above, multiple types of versions of a document can be saved and the user can also check in data changes. Accordingly, in some embodiments of the invention, a determination 316 is made as to what types of changes are being made and various levels 317, 318, 319 are required for each.

Templates/Merge Fields

As explained above, templates are very useful tools in document creation. For example, legal language templates contain the boilerplate legal language, terms and conditions associated with common contracts. Examples of language templates that could be associated with an NDA agreement type are Unilateral NDA—Inbound, Unilateral NDA—Outbound, and Mutual Nondisclosure Agreement. Other examples may be language templates that are regional variations or client specific versions of contracts.

In some embodiments of the invention, legal language templates have embedded merge fields contained within them that are auto populated during agreement creation. In some embodiments of the invention, the add-in 115 manages contract templates and clauses in t business management application 110. The tool can also be used to create and maintain agreement templates or clauses, and manage them within the business management application 110 from the Contract Template and Clause Libraries.

Figure 4:
FIG. 4 illustrates an example of browser-based template browsing menu according to some embodiments of the invention.

In some embodiments of the invention, an existing template from the business management application 110 can be checked out for editing by clicking a Check-Out menu from the Templates tab of the add in ribbon in the document creation application 105. In some embodiments of the invention, once the menu is clicked, the user is presented with a browser-based form or native document creation menu which loads the browsing of templates via the structured database management system framework. The user can search on various parameters and choose a template and click "Open" to open the word document. FIG. 4 illustrates an example of browser-based template browsing menu 400 according to some embodiments of the invention.

In some embodiments of the invention, once a template is opened, the add-in 115 automatically detects the document type and enables certain menus within ribbon that relate to that particular template.

In some embodiments of the invention, the business management application 110 add-in 115 allows users, via ribbon menu, to insert standard clauses and clause references while authoring a template. Even though users will have standard clauses that they wish to use in every contract, through negotiations, your trading partners will not always agree with them. Accordingly, the business management application 110 add-in 115 provides the concept of a playbook comprising alternative clauses or fallback provisions. This simply allows users to select alternative language with differing degrees of risk and acceptability, so that users can replace their current clause with it.

Referring again to FIG. 2B, to launch the playbook, a user can simply click on the Playbook menu from the Content/Library tab. Once the menu is clicked, the user is presented with a browser based form which loads the browsing of clauses. The user can search on various parameters and choose a clause which they wish to insert into the document either as an inline text or as a reference. The reference to the clause will be resolved at the time of generation of the agreement.

The Check-Out can also be used for creating new templates based on existing template.

Merge Fields

In some embodiments of the invention, the agreement management tools include tools for using merge fields. Once the document is available for amending, the user can insert more content by inserting merge fields, clauses, etc. A merge field is a placeholder for objects, i.e. text, which you insert into a document during the creation and versioning process. According to some embodiments of the invention, the add-in includes tools for automatically inserting structured data from the structured database management system 120 into each merge field. Additionally, the user can format, copy, move, or delete a merge field. In some embodiments of the invention, the business management application 110 add-in 115 uses fields in the document creation application 105 to insert an object as a merge field in a document. In some embodiments of the invention, the business management application 110 add-in 115 extends the merge field definition to customize merge field signature.

Users can start inserting merge fields by placing the cursor into appropriate sections of the document. Selecting a merge field to insert into a document is context sensitive and also the option to insert fields into a section or table is dependent on how objects are related.

Figure 5A:
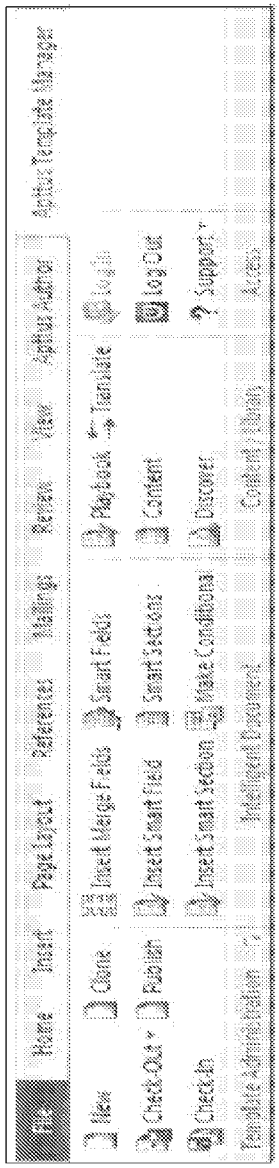
FIG. 5A illustrates an example of an interactive ribbon menu for inserting merge fields into a document according to some embodiments of the invention.

FIG. 5A illustrates an example of an interactive ribbon menu 500 for inserting merge fields into a document according to some embodiments of the invention. According to some embodiments of the invention, merge fields can be inserted by clicking the menu Insert Merge Fields from the ribbon menu 500.

Figure 5B:
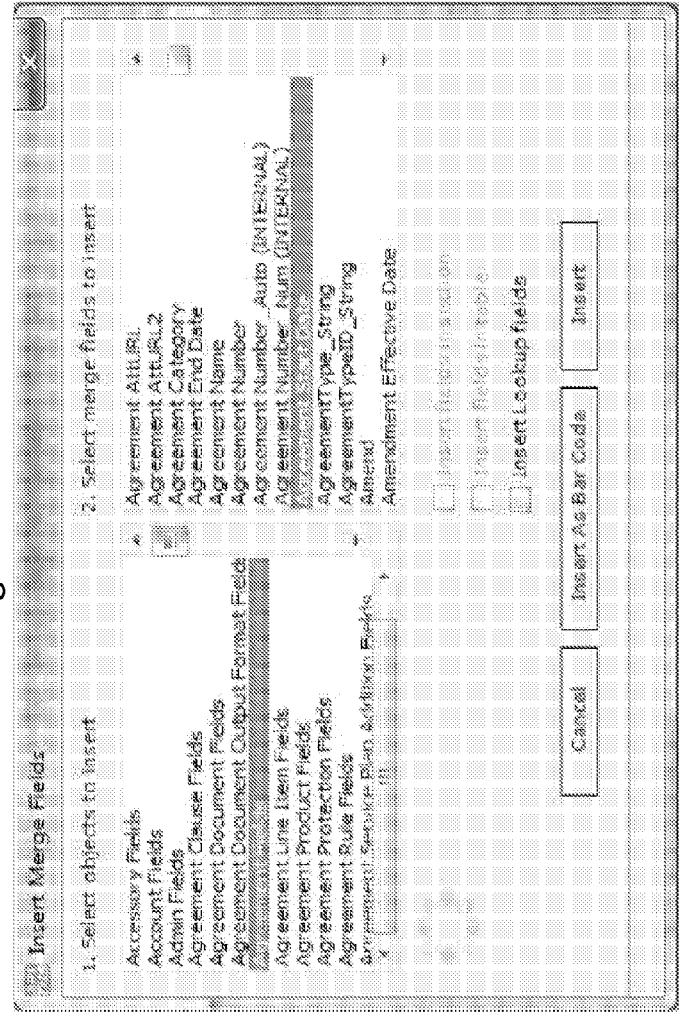
FIG. 5B illustrates an interface for selecting merge fields according to some embodiments of the invention.

In some embodiments of the invention, merge fields are used to automatically insert legal clauses into contracts and fill the clauses with structured data from a structured database management system. FIG. 5B illustrates an interface for selecting merge fields according to some embodiments of the invention.

Smart Fields

Some attempts have been made to insert structured data into word processing applications; however, these attempts have come up short for a variety of reasons. For example, according to prior attempts, once structured data is inserted into a document, it become completely static and it loses its intelligence through the link to the structured database being cut off. According to these approaches, if an object inserted into a contract from a structured data system is subsequently changed during a contract negotiation to the original parties dissatisfaction, that object must be manually changed back to its original value since it has lost all connection to the structured database system.

The inventors have solved this problem by using Smart Fields. Smart fields are specialized merge fields that retain the business management application's field definition even after document generation, wherein the retention of the field definition is accomplished by the business management application 110 add-in 115 flagging objects, i.e. text as subject to the Smart Field during an authoring session. As explained above, in some embodiments of the invention, each time a user logs in with his credentials, a session identifier is stored in the add-in 115. Accordingly, on a successive review of document with Smart Fields, the add-in 115 knows what data was flagged as being subject to the Smart Fields.

Referring again to FIG. 5A, Smart Fields can be inserted by clicking the menu Insert Smart Field from the intelligent document tab.

In some embodiments of the invention, the objects, i.e. text, contained within the Smart Fields appears exactly the same to an outside user. In fact, the outside user can change the text of the document despite the text originally being inserted from structured database system. The user of the add-in 115 may later see what changes the outside user made to the data in the Smart Fields by referring the session identifiers of past log-ins. In fact, co-pending application Ser. No. 13/423,282, filed Mar. 19, 2012, entitled "Reconciling Smart Fields" discloses this process of reconciliation in greater detail.

Conditional Text

Figure 6:
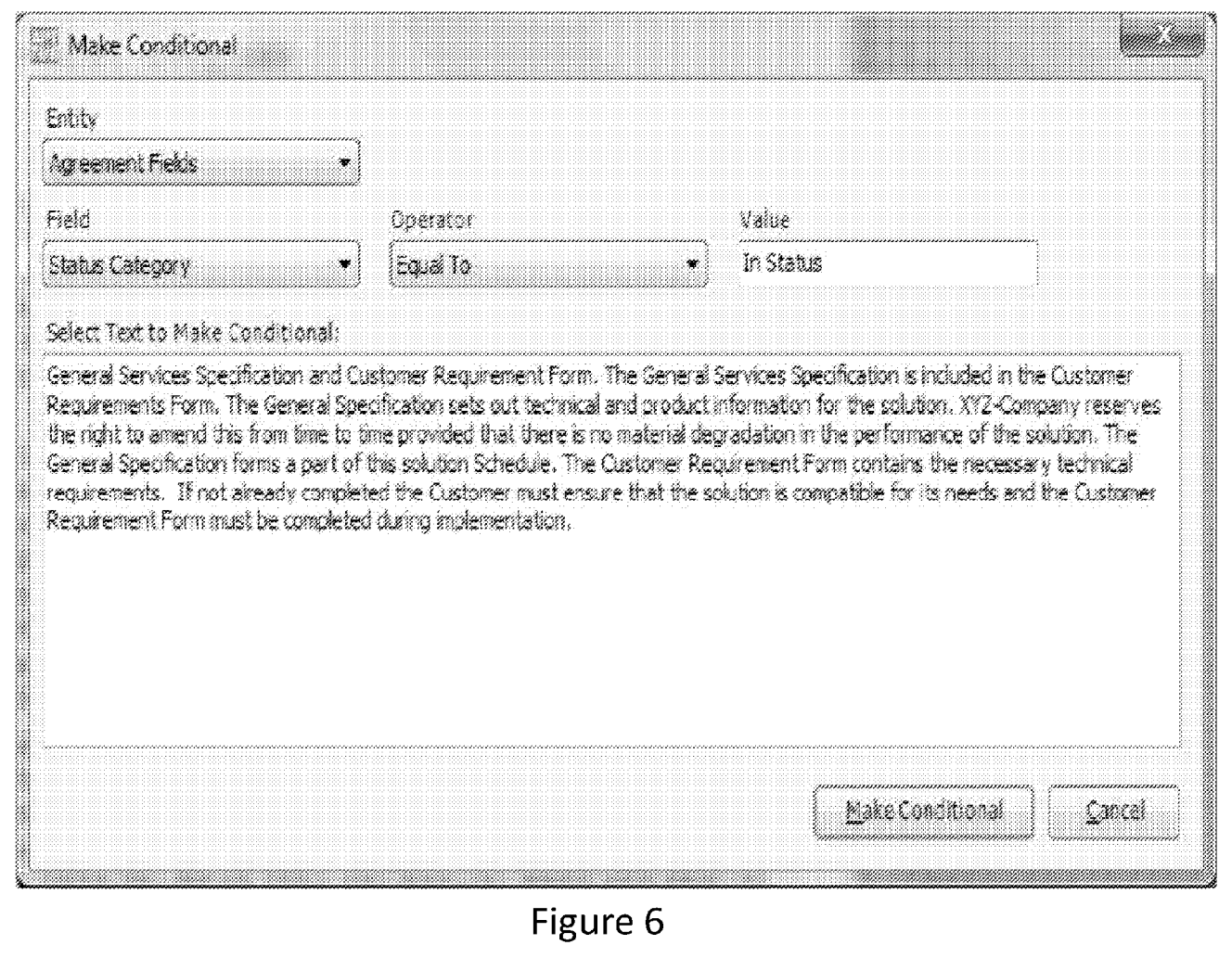

In some embodiments of the invention, users can select a region of text in a template and make it conditional based on an expression containing one or more merge fields. Referring again to FIG. 5A, text is made conditional by selecting the desired text in the template and clicking on the Make Conditional menu from the Intelligent Document tab. FIG. 6 illustrates an interface for defining contract language as conditional according to some embodiments of the invention.

Language Translation

Some embodiments of the invention involve the business management application 110 add-in 115 to allow users the ability to translate a piece of content from one language or another. In a specific example, the business management application 110 add-in 115 uses the power of Microsoft Bing Translation Engine and does a real time language convertor. Referring again to FIG. 5A, clicking on the Translate menu from the Content/Library tab launches the translate tool. Once a user validates and happy with the translation, the translated text can be replaced back into the document in click of a button. In some embodiments of the invention, the business management application 110 add-in 115 loads the translation view in a native Word task pane providing an ability to perform a side-by-side view of the agreement document and translation view.

Figure 7:
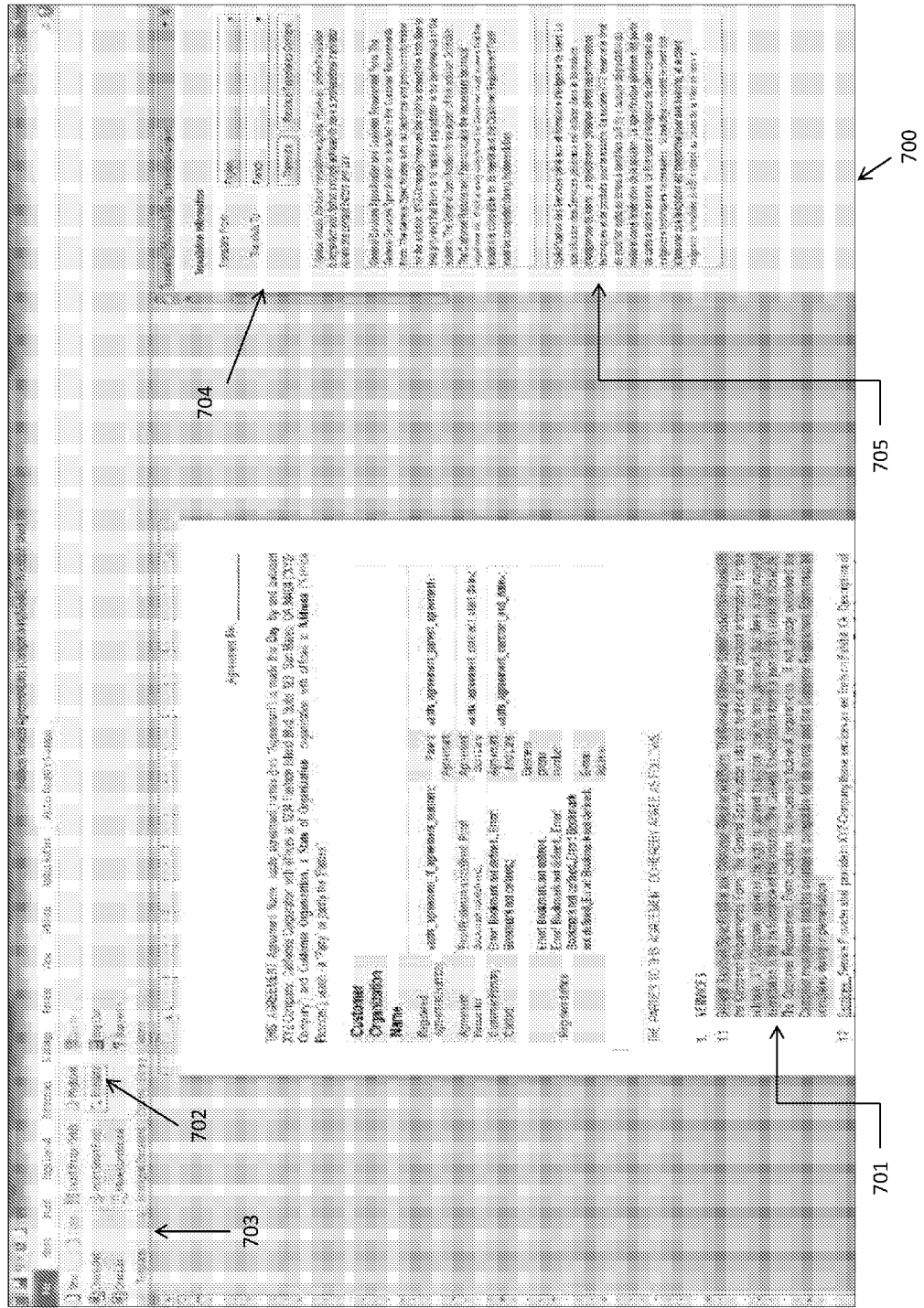
FIG. 7 illustrates an exemplary interface for performing a side-by-side translation comparison of contract text within a word processing application according to some embodiments of the invention.

FIG. 7 illustrates an exemplary interface 700 for performing a side-by-side translation comparison of contract text within a word processing application according to some embodiments of the invention. As shown, the selected clause 701 was highlighted and the translate button 702 was selected in the ribbon menu 703, causing a side-by-side comparison of the content of the selected text to be shown in a first language 704 and a second language 705.

Figure 8A:
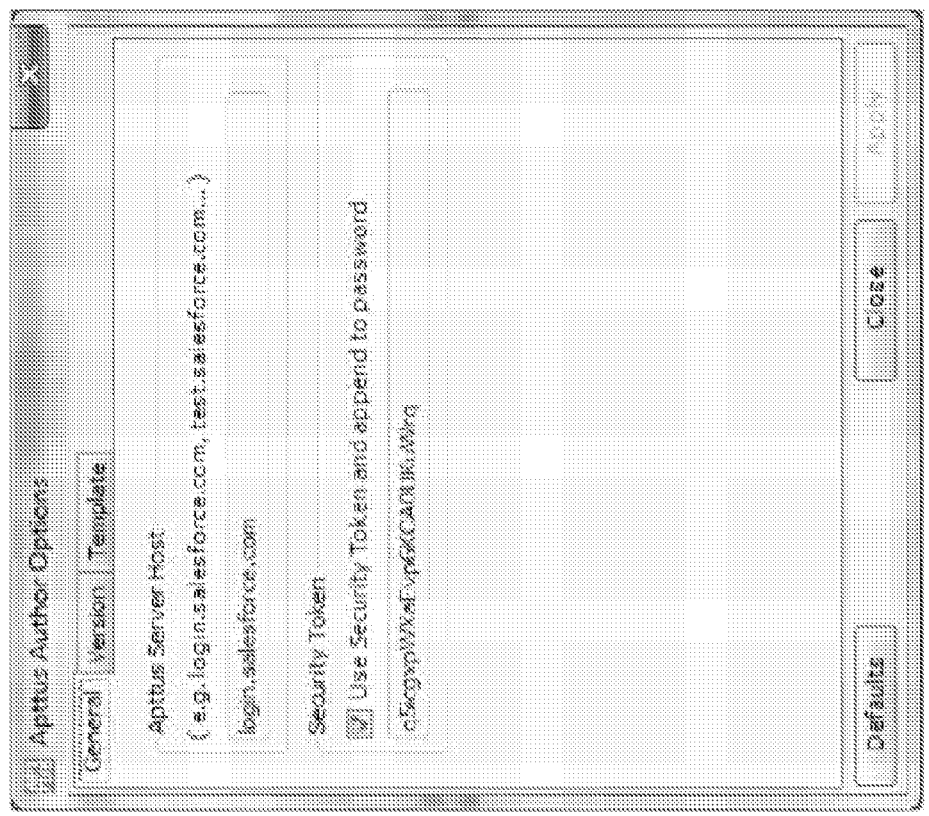
FIG. 8A illustrates a General User Preference menu according to some embodiments of the invention.
Figure 8B:
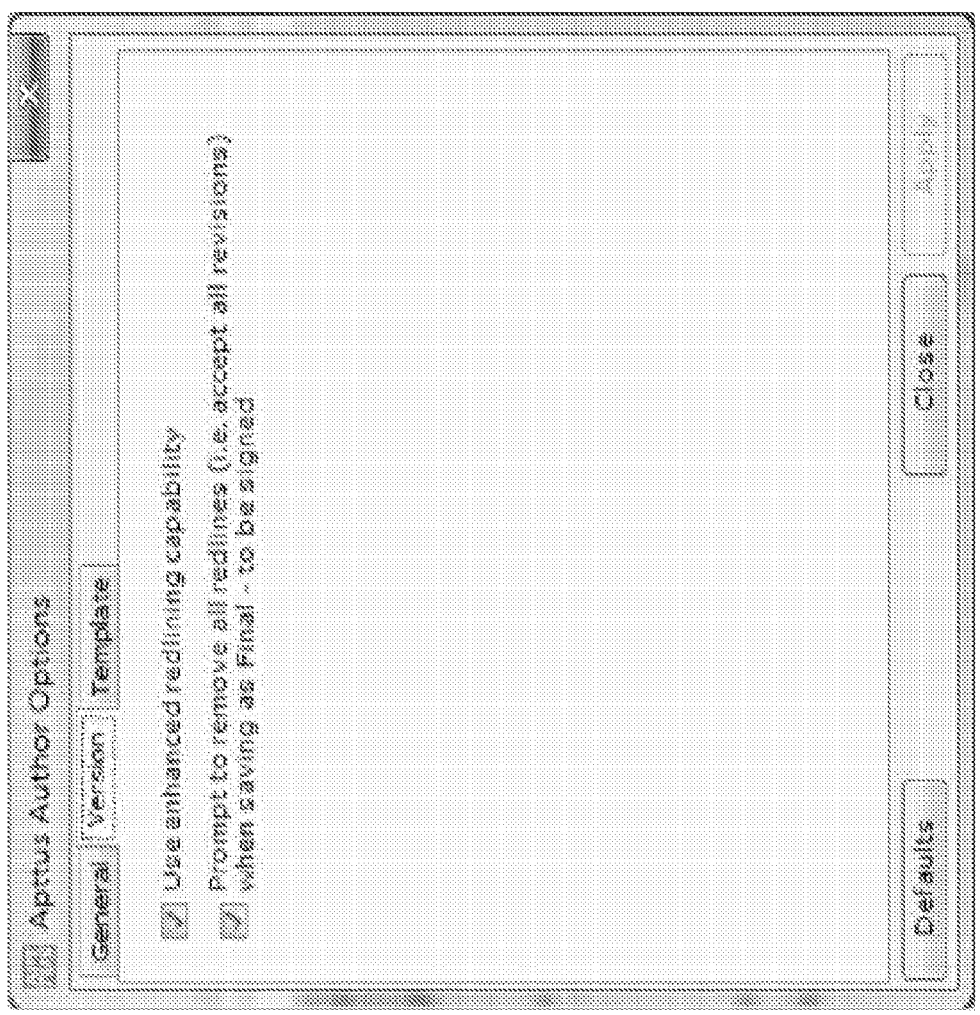
FIG. 8B illustrates a Version User Preference menu according to some embodiments of the invention.
Figure 8C:
FIG. 8C illustrates a Template User Preference menu according to some embodiments of the invention.

In some embodiments of the invention, the business management application 110 add-in 115 allows users to set their own preferences for working with the add-in. User preferences are stored locally in each of the client's computer. The user preference can be set by invoking the options dialog by clicking the dialog launcher icon which is attached to Versions and Access tabs in the ribbon or Templates and Access tabs in the Template Manager tabs. FIGS. 8A-8C illustrate examples of User Preference menus according to some embodiments of the invention. The general tab allows the user to capture general preferences through the add-in 115, the version tab allows the user to capture preferences while saving agreement versions, and the Template tab allows the user to capture preferences during the authoring of templates.

Figure 9A:
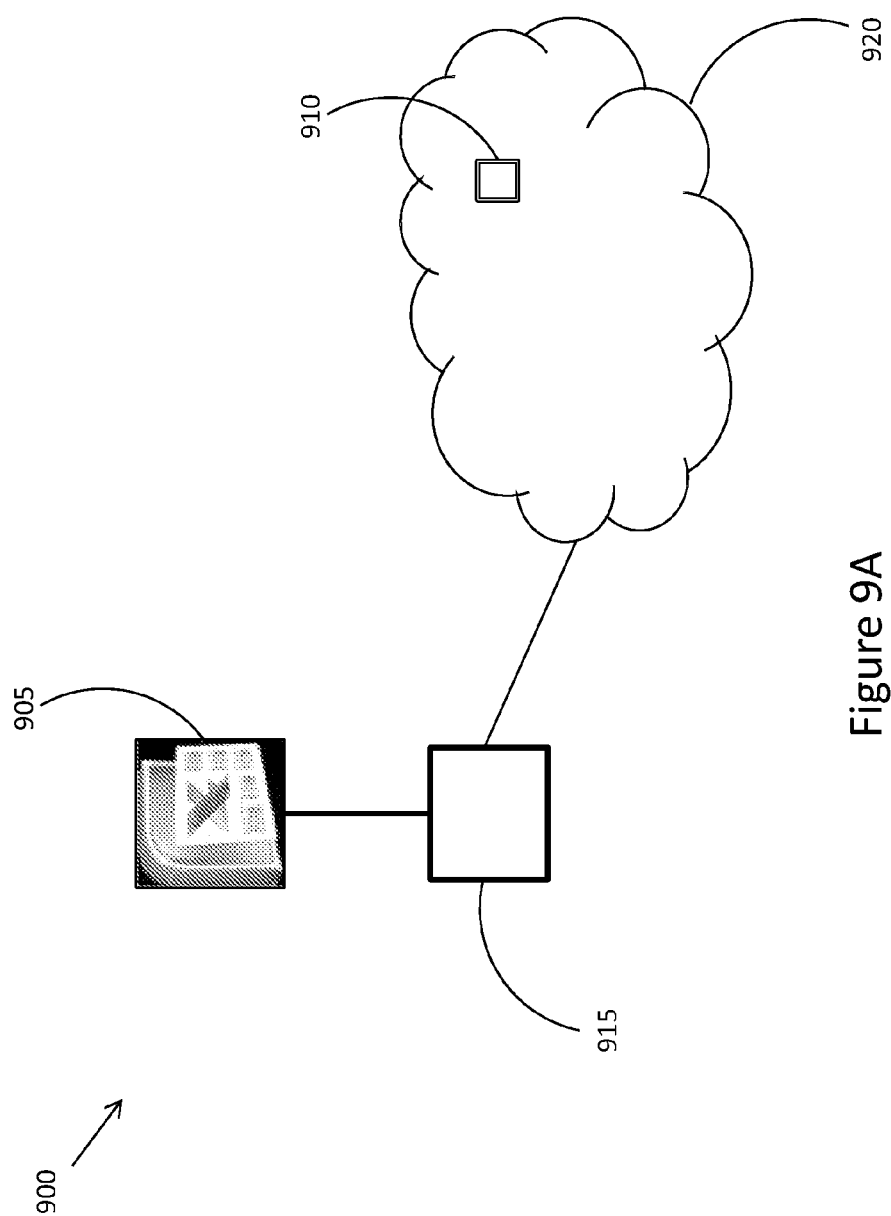
FIG. 9A illustrates a spreadsheet creation application with access to business management application according to some embodiments of the invention.

Some embodiments of the invention involve providing a spreadsheet creation application with access to business management application that is hosted on a cloud-based structured database management system or a behind the firewall application. FIG. 9A illustrates a spreadsheet creation application 905 with access to business management application 910 according to some embodiments of the invention.

In some embodiments, the business management application 910 is accessed by the spreadsheet creation application 905 through a managed add-in 915 that transfers web service calls to the spreadsheet creation application 910 via the structured database management system 920. Accordingly, a user accesses structured data from the structured database management system 920 as well as the business management application's 910 functionality via the spreadsheet creation application 905.

Figure 9B:
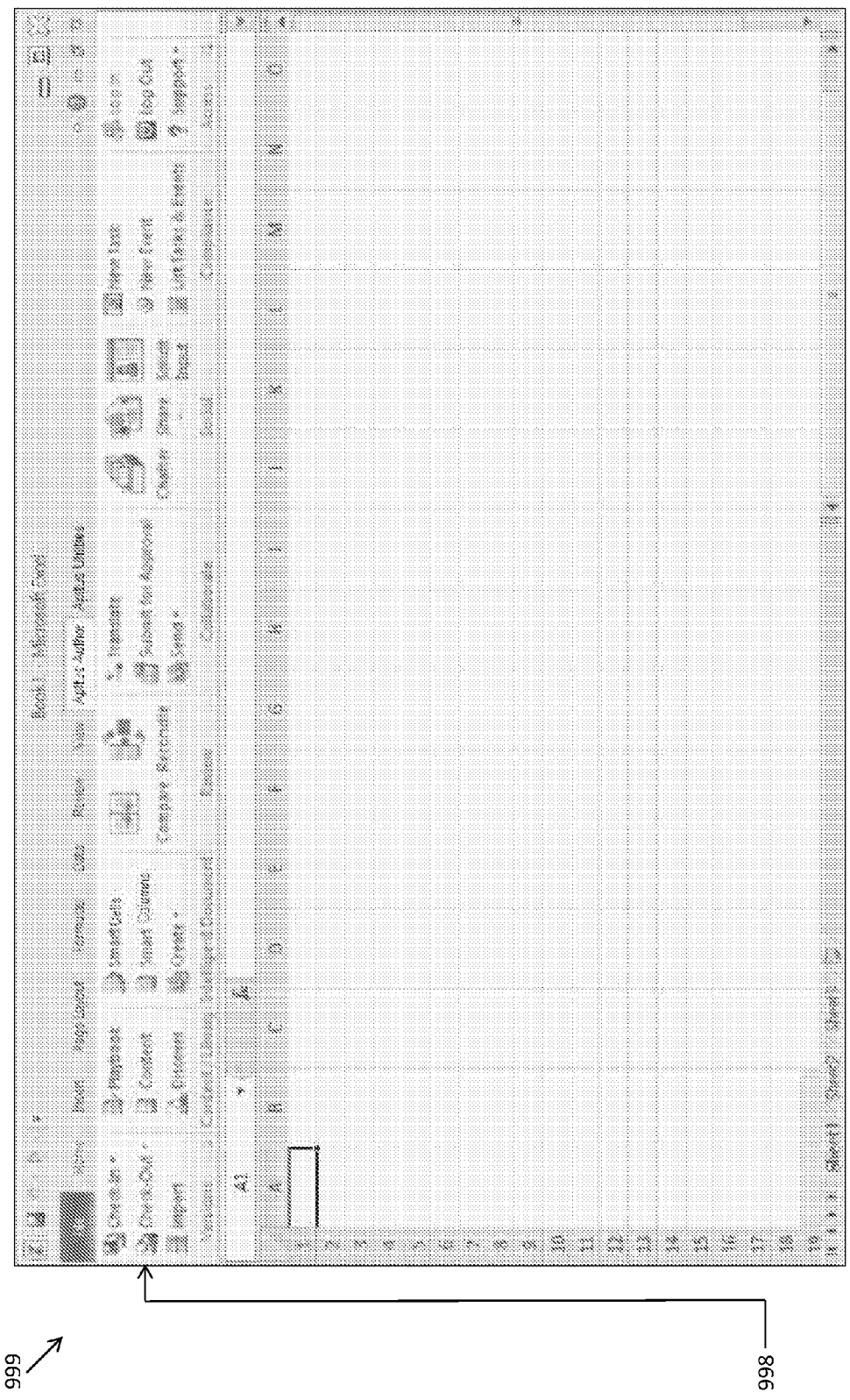
FIG. 9B illustrates an example of a spreadsheet application interface with an interactive ribbon menu for interacting with the business management application and the structured database management system via a document creation application according to some embodiments of the invention.

FIG. 9B illustrates an example of a spreadsheet application interface 999 with an interactive ribbon menu 998 for interacting with the business management application 910 and the structured database management system 920 via a document creation application 905 according to some embodiments of the invention. According to FIG. 9B, the interactive ribbon menu 998 includes a variety of tools for adding collaborative functionality and lifecycle management utility to a word processing document. For example, the tools include at least all of those disclosed above in connection with the document creation and processing application.

Figure 10:
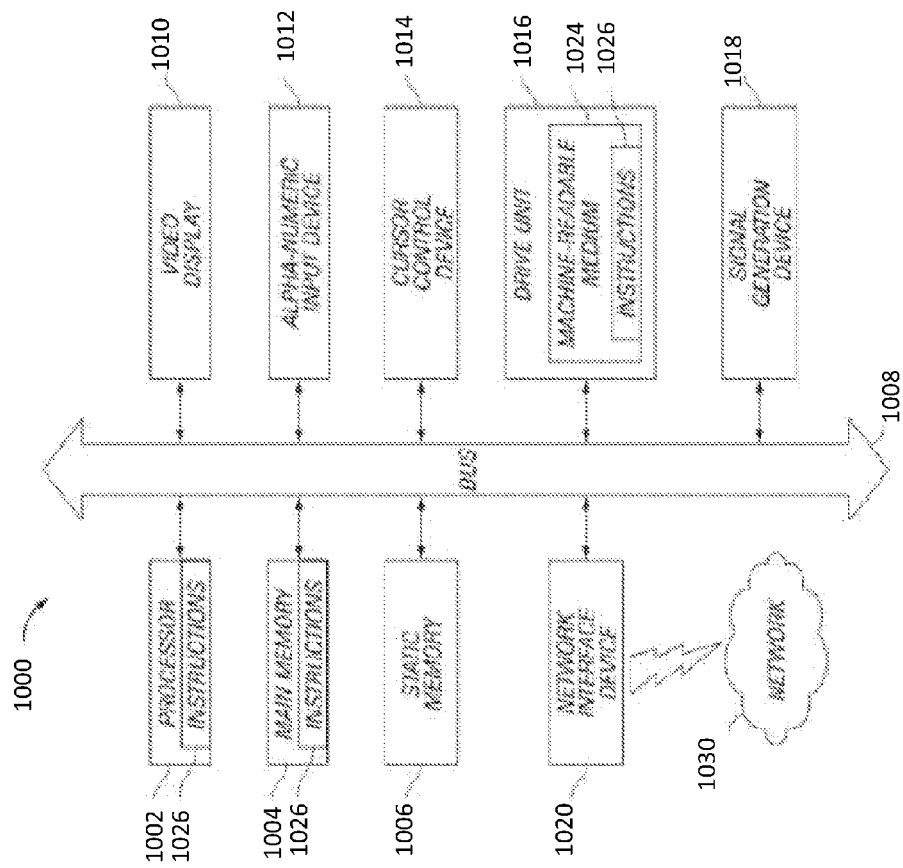
FIG. 10 is a block schematic diagram of a machine in the exemplary form of a computer system within which a set of instructions may be programmed to cause the machine to execute the logic steps of the invention.

FIG. 10 is a block schematic diagram of a machine in the exemplary form of a computer system 1000 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1000 includes a processor 1002, a main memory 1004 and a static memory 1006, which communicate with each other via a bus 1008. The computer system 1000 may further include a display unit 1010, for example, a liquid crystal display (LCD) or a cathode ray tube (CRT). The computer system 1000 also includes an alphanumeric input device 1012, for example, a keyboard; a cursor control device 1014, for example, a mouse; a disk drive unit 1016, a signal generation device 1018, for example, a speaker, and a network interface device 1020.

The disk drive unit 1016 includes a machine-readable medium 1024 on which is stored a set of executable instructions, i.e. software, 1026 embodying any one, or all, of the methodologies described herein below. The software 1026 is also shown to reside, completely or at least partially, within the main memory 1004 and/or within the processor 1002. The software 1026 may further be transmitted or received over a network 1028, 1030 by means of a network interface device 1020.

In contrast to the system 1000 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A computer-implemented method comprising:
   in a computation device;
   configuring a word processing application with a plugin comprising instructions for linking said word processing application with a contract creation and contract lifecycle management application that runs on a cloud-based platform of a structured database management system and that stores datum in said structured database management system, wherein said plugin requires a user login, and wherein said plugin stores a session identifier each time a user logs into said plugin so that successive logins can be referenced and attributed to said user; and
   configuring said plugin with a plurality of tools that, when executed, accesses utilities of said contract creation and contract lifecycle management application via said word processing application without leaving an interface of said word processing application, wherein one or more tools at least comprise each of:
   an executable data-pull utility that pulls datum from the structured database management system and inserts said datum into a structured field in a document in said word processing application;
   an executable data-push utility that pushes datum from a structured field in the document in said word processing application to said structured database management system and stores said datum based on a value of said structured field;
   an executable document-push utility that pushes a version of a document from said word processing application to said structured database management system and enabling a user of said word processing application to stores said document as a first version type and at least one additional version type;

an executable template-pull utility that pulls one or more document templates from the structured database management system and inserts said one or more document templates in a document in said word processing application;

an executable template-push utility that pushes a user-authored template from said word processing application to said structured database management system and stores said document therein;

translation tools comprising an executable translation utility that performs language translation on user-specified document text from a first language to a second language and displays the text in said first language alongside the text in said second language within said word processing application itself;

an interactive menu for interacting with the business management application comprising a playbook to allow a user to view alternative contract clauses each representing a different degree of risk and to select one of said alternative clauses for insertion into a document and a field definition tool that flags objects within said document as having a field value associated with said object.

2. The computer-implemented method of claim 1, wherein said business management application comprises a business lifecycle management application configured for creating a quote for a plurality of customers, engaging and negotiating an agreement, managing customer orders, and invoicing customers.

3. The computer-implemented method of claim 1, wherein said executable data-push utility further comprises authorization tools which require a user of said document creation application to authorize itself before said data-push utility stores said datum in said structured database management system.

4. The computer-implemented method of claim 3, wherein storing a document as a first version type requires said user to authorize itself with a first credential, and wherein storing said document as a second version type requires said user to authorize itself with a second credential.

5. The computer-implemented method of claim 1, wherein said document template access tools further comprises document template access tools comprising an executable template-push utility that pushes a user-authored template from said document creation application to said structured database management system and stores said document therein.

6. The computer-implemented method of claim 1, wherein said plug-in requires a user login, and wherein said plug-in stores a session identifier each time a user logs in to said plug-in so that successive logins can be referenced and attributed to said user.

7. The computer-implemented method of claim 6, wherein said field definition tool associates session identifier with said flags such that changes to said objects within said document having a field value associated with said object can be detected on a successive login.

8. The computer-implemented method of claim 1, wherein the interactive menu facilitates an ability to view social media feeds from within the document creation application.

9. The computer-implemented method of claim 1, further comprising allowing the user to search the playbook based on various parameters.

10. The computer-implemented method of claim 1, further comprising inserting the selected clause into the document as one of inline text and a reference for later resolution.

11. A system comprising:

a non-transitory machine-readable storage medium, having stored there on a set of instructions executable by the machine-readable medium and operable to cause a programmable processor to perform the steps comprising:

configuring a word processing application with a plugin comprising instructions for linking said word processing application with a contract creation and contract lifecycle management application that runs on a cloud-based platform of a structured database management system and that stores datum in said structured database management system, wherein said plugin requires a user login, and wherein said plugin stores a session identifier each time a user logs in to said plugin so that successive logins can be referenced and attributed to said user; and configuring said plugin with a plurality of tools that, when executed, accesses utilities of said contract creation and contract lifecycle management application via said word processing application without leaving an interface of said word processing application, wherein one or more tools at least comprise each of:

an executable data-pull utility that pulls datum from the structured database management system and inserts said datum into a structured field in a document in said word processing application;

an executable data-push utility that pushes datum from a structured field in the document in said word processing application to said structured database management system and stores said datum based on a value of said structured field;

an executable document-push utility that pushes a version of a document from said word processing application to said structured database management system and enabling a user of said word processing application to store said document as a first version type and at least one additional version type;

an executable template-pull utility that pulls one or more document templates from the structured database management system and inserts said one or more document templates in a document in said word processing application;

an executable template-push utility that pushes a user-authored template from said word processing application to said structured database management system and stores said document therein;

translation tools comprising an executable translation utility that performs language translation on user-specified document text from a first language to a second language and displays the text in said first language alongside the text in said second language within said word processing application itself;

an interactive menu for interacting with the business management application comprising a playbook to allow a user to view alternative contract clauses each representing a different degree of risk and to select one of said alternative clauses for insertion into a document and a field definition tool that flags objects within said document as having a field value associated with said object.

12. The system of claim 11, wherein said executable data-push utility further comprises authorization tools which require a user of said document creation application to authorize itself before said data-push utility stores said datum in said structured database management system.

13. The system of claim 11, wherein said field definition tool associates session identifier with said flags such that changes to said objects within said document having a field value associated with said object can be detected on a successive login.

14. The system of claim 11, wherein the interactive menu facilitates an ability to view social media feeds from within the word processing application.

15. The system of claim 11, configured to allow the user to search the playbook based on various parameters.

16. The system of claim 11, configured to insert the selected clause into the document as one of inline text and a reference for later resolution.

* * * * *